United States Patent [19]

Caughey

[11] Patent Number: 4,526,642

[45] Date of Patent: Jul. 2, 1985

[54] FLYLEAF HEAT SEALER

[75] Inventor: Robert A. Caughey, Antrim, N.H.

[73] Assignee: permaTek, Inc., Las Vegas, Nev.

[21] Appl. No.: 447,273

[22] Filed: Dec. 6, 1982

[51] Int. Cl.[3] ........................ B42C 9/00; B42C 13/00; C09J 5/06

[52] U.S. Cl. .................................... 156/311; 156/381; 156/498; 156/499; 156/555; 156/583.1; 156/908; 412/8; 412/28; 412/902

[58] Field of Search ............ 156/555, 499, 381, 477.1, 156/477 B, 583.1, 583.5, 498, 311, 308.2, 908; 412/28, 5, 4, 8, 902

[56] References Cited

U.S. PATENT DOCUMENTS 3,488,244 1/1970 Lepisto ................................ 156/311

3,547,742 12/1970 Cottrell ............................... 156/311

4,014,732 3/1977 Beckert et al. .................. 156/477 B 4,149,289 4/1979 Sahlin .................................. 412/902

*Primary Examiner*—Michael Wityshyn

*Attorney, Agent, or Firm*—J. David Dainow

[57] ABSTRACT

A flyleaf heat sealer for adhering a flyleaf having its inner surface pre-coated with hot melt or heat sensitive adhesive to the exposed outer surfaces of the end sheets of a book block insert, includes means for engaging and transporting a book block insert and the flyleaf folded therearound, means for directing a flow of air heated to a temperature adequate to melt the adhesive against and impinging upon the outer surfaces of the flyleaf, and means for pressing and cooling the flyleaf and book insert between them and removing heat from the flyleaf and book block, and thus curing and hardening the adhesive.

11 Claims, 2 Drawing Figures

FLYLEAF HEAT SEALER

BACKGROUND OF THE INVENTION

Figure 1:
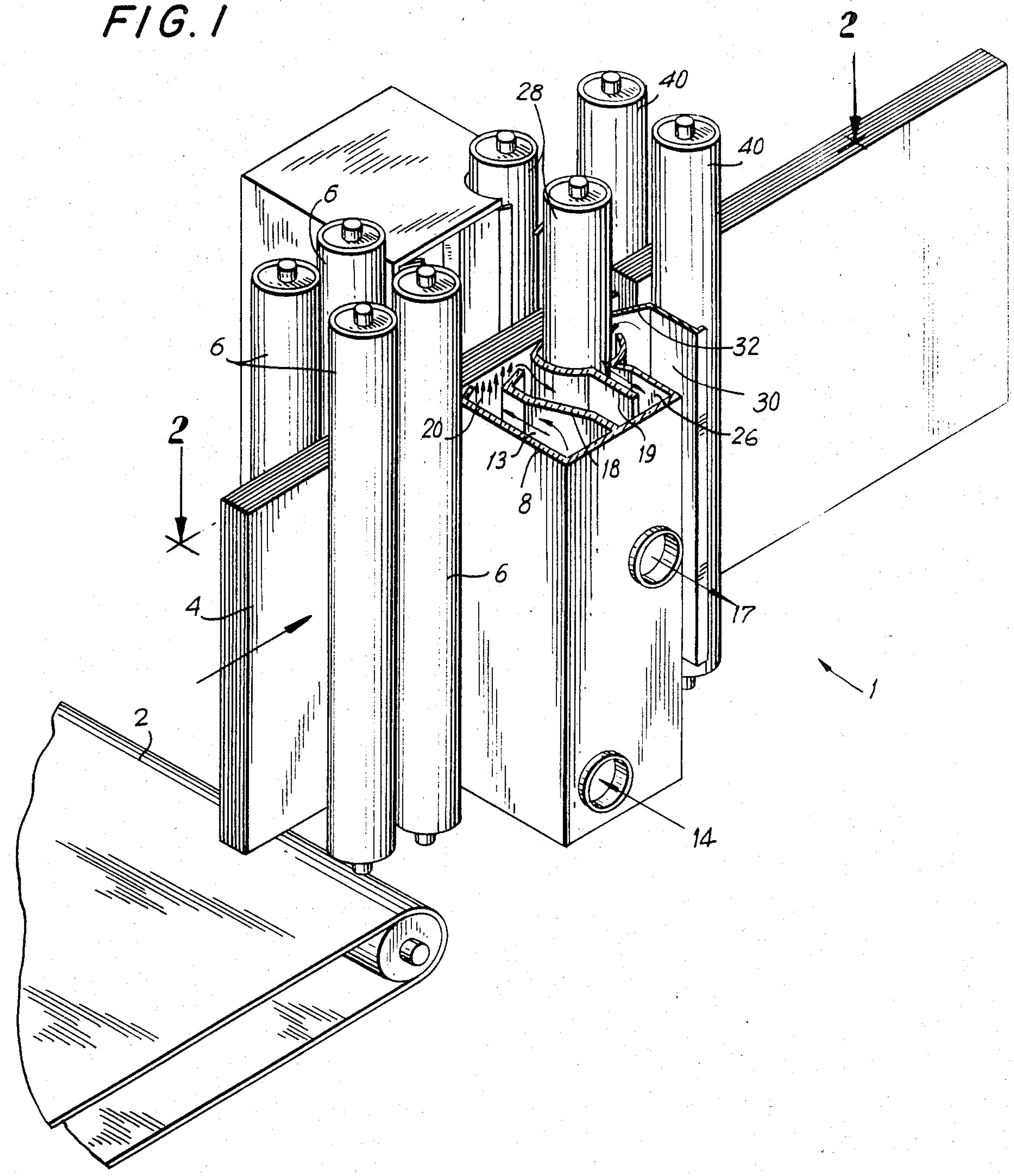

This invention is in the field of manufacturing books and particularly in the stage where a flyleaf is adhered to the end sheets of a book insert or book block following the perfect binding stage and before the casing-in stage. The flyleaf is basically a reinforcing sheet wrapped around the spine and overlying part or all of the end papers and adhered thereto by adhesive. In one prior art technique for adhering a flyleaf, liquid adhesive was applied to one or other of the adhering surfaces by rollers, followed by contact of other pressure rollers intended to evenly distribute the adhesive between the adhered surfaces. The use of liquid adhesive has a great variety of inherent drawbacks over and above the burden of containing, applying and distributing adhesive to the appropriate surfaces. Frequently excess glue seeps out onto edges of the book or onto parts of the apparatus; also there may develop air pockets surrounded and trapped by adhesive leading to bubbles beneath the flyleaf and/or torn flyleaf. A significant improvement in this stage of book manufacture has been the development of pre-glued flyleaf sheets which have on the inside surface a dry layer of hot melt adhesive, i.e., heat sensitive material which will soften, melt and become tacky upon subsequent application of heat thereto. With this kind of flyleaf preparation the only basic requirement is that heat and pressure be applied to the outer surface of the flyleaf which is wrapped around the book insert, until the adhesive melts and the overlying surfaces adhere to each other. Heat and pressure are applied by heated rollers or other means. An inherent problem herein, leading to loss of time and loss of product has been non-uniform melting of the hot melt adhesive surface with consequences as described above and subsequent non-uniform cooling and warpage of the resultant products which are typically piled into stacks to cool and return to ambient temperature.

SUMMARY OF THE INVENTION

The apparatus and method of the invention herein, overcome the various above-noted problems, particularly because the hot melt adhesive is more uniformly heated and then is cooled, hardened and cured before the book leaves the apparatus. In brief each book insert and folded flyleaf combination is transported through a housing where the outer surface of the flyleaf while in continuous forward motion is exposed to highly heated fast flowing air which melts the heat-sensitive glue on the flyleaf inner surface; shortly thereafter, such book and flyleaf pass between a pair of cooled pressure rolls which uniformly cause essentially all portions of the flyleaf to intimately contact the book's end sheets and adhere to said end sheets due to the cooling of the adhesive below its melting point. This cooling is effected by the transfer of heat form the flyleaf to the cool roll, and from the glue line to the book insert. Books then discharged from the cool pressure rolls have a temperature reduced to or near ambient temperature. This largely eliminates warpage due to non-uniform cooling and drying and/or due to non-uniform pressure applied to the books as they sit in stacks cooling. Furthermore, the application of high temperature air moving rapidly against the outer surface of the flyleaf sheets contributes to uniform heat distribution over the entire surface to be affected, as contrasted with using heated rollers which have only line contact with the surface at any given moment.

A particular advantage and improvement of the present invention is the ability to transport each book and flyleaf combination through the apparatus or sealing station at rates as high as one hundred books per minute, which allows the overall manufacturing process to proceed without slowing down for this heating and pressing phase. In the prior art such application and distribution of the glue and/or application of heat and pressure took longer than certain other phases, and thus slowed down the entire process and rendered various improvements and advances in other phases of less value than their potential merited.

DESCRIPTION OF THE DRAWINGS AND THE PREFERRED EMBODIMENTS

Figure 2:
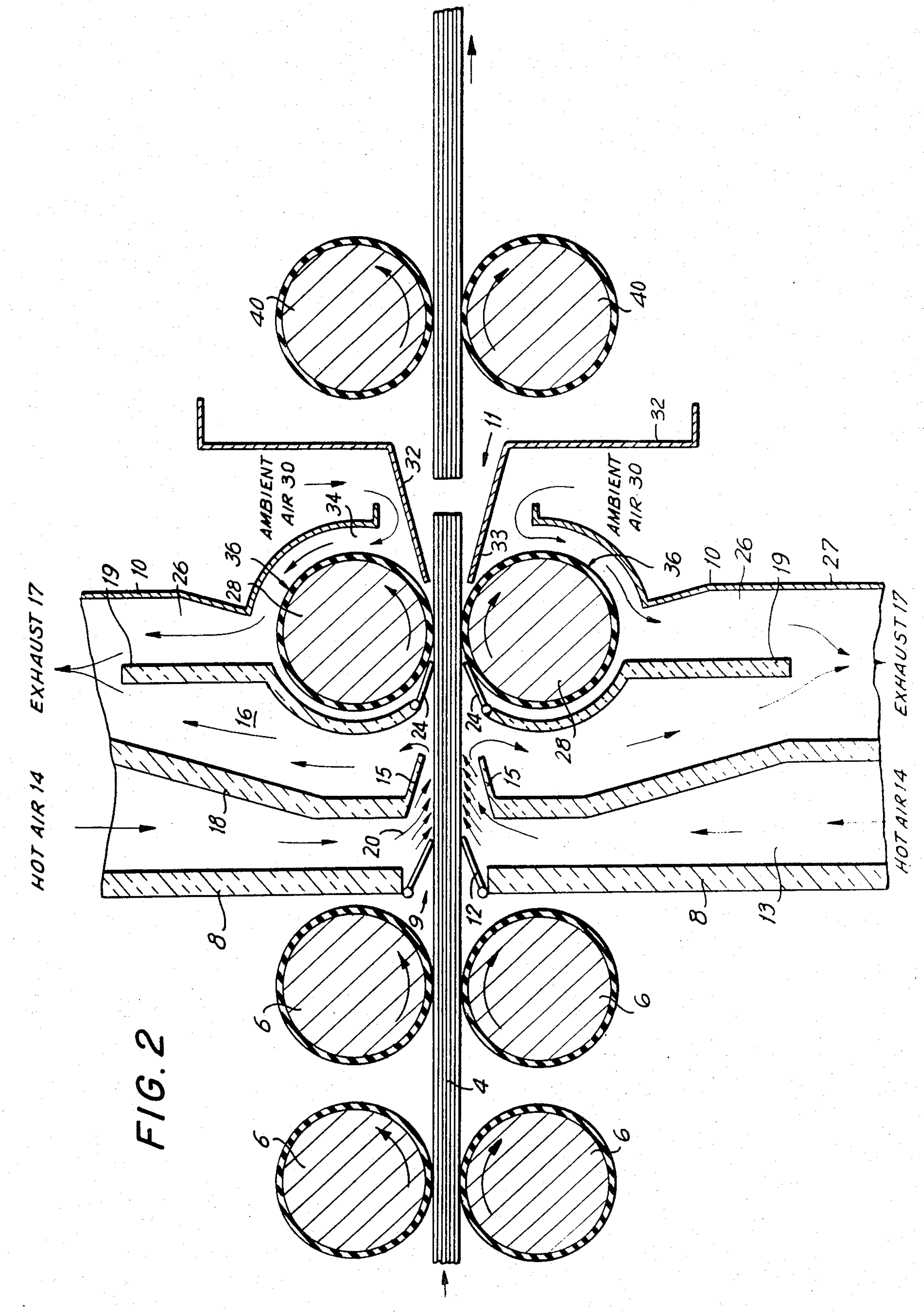

FIG. 1 is a front perspective view of the flyleaf heat sealer invention, and FIG. 2 is a plan sectional view of the apparatus shown in FIG. 1.

The reinforcing flyleaf has its center part adhered with a first adhesive to the spine of the book insert and then is wrapped to overlie the front and rear end sheets in preparation for final attachment. The inner surface of the flyleaf facing and overlying the end sheets of the book insert is coated with a hot melt or heat sensitive adhesive, i.e., one which will soften, and become tacky upon the application of heat to either side of the flyleaf; such hot melt adhesive has a lower melting point than that of the first adhesive. The apparatus 1 illustrated in FIGS. 1 and 2 operates with an in-feed conveyor 2 which feeds and directs the typical book insert and flyleaf combination 4 into the sealer apparatus. The primary pressure rollers 6 grip and drive the book insert into the housing defined generally by insulated walls 8, front entrance 9, rear walls 10 and exit 11. Rollers 6 apply pressure to opposite outer sides of the flyleaf, thus assuring adequate and uniform contact therebetween while also continuing to feed this book unit into the chamber.

Books passing through gates 12 enter a first chamber 13 which receives the flow of highly heated air 14 from a source not shown. This air flow is directed around baffle 15 and thence through second chamber 16 to exit 17, chamber 16 being defined by interior insulated walls 18 and 19. The heated air impinges on and heats the flyleaf in the area indicated by arrows 20 on the rapidly moving book insert. During this heating phase the glue adhering to the spine of the book block and the center of the flyleaf does not soften because of its higher melting temperture, and/or because the spine of the book is not subjected to the heated air stream.

Next the heated flyleaf and enclosed book insert pass through second gates 24 into a third chamber 26 defined by inner wall 19 and front wall 10. Within this third chamber is the pair of pressure rolls 28 which are cooled by a flow of ambient or cool air 30 directed by baffles 32 into the cooling zone 34 and against the exposed almost 180° of circumferential surface 36 of roll 28 and thence out exit 17 with the heated air exhaust.

Rolls 28 urge the flyleaves, melted adhesive and enclosed book insert into secure attachment while also cooling and hardening the adhesive by virture of the fact that rollers 28 are cooled to or near ambient temperature by the air flow 30. The book insert with the flyleaf adhered thereto by cooled and cured adhesive are received by final rolls 40 and directed to the next station.

The hot air is caused to flow at a substantially high velocity through chamber 13, around baffle 15 with the temperature and air velocity of the air varied to achieve necessary melting of the adhesive, such being dependent upon the rate of travel of the books through the chamber, and the basis weight of the paper, and of course the nature and characteristics of the adhesive. For example, if the basis weight of the paper is approximately 70 lbs. per 3,000 sq. ft. and the adhesive melting point is 160° F., the inlet hot air temperature may have to be as high as 600° F. If the pass-rate of a book is 200 ft. per minute and the width of the book being bonded is 12 inches, the heat requirements may be as high as 20,000 BTUH per side. Since very little time can be allowed for the book to be in the heating chamber, it may be expected that the thermal efficiency would not exceed 50%, thus requiring 40,000 BTUH per side of book.

In a preferred example the hot melt adhesive used has a melting temperature of 160° F. while the melting temperature of the earlier applied first adhesive between the spine and the center of the flyleaf is substantially higher than 160° F. The flyleaf has thickness of about 0.006", the velocity of the book inserts is about 200 ft. per minute, the air temperature in the contact zone 20 is about 600° F., and the air velocity is approximately 2000 fpm. This establishes an exposure time of the flyleaf to the hot air of about 0.075 sec. in the cooling chamber where there is contact with roller 28 and exposure to cooling air during final exit.

Typically the various rolls are constructed 2½"in diameter with 1½"steel shaft covered with a ½" thick coating of heat resistent elastomer i.e., silicone rubber of durometer about 65 which is sufficiently resilient to conform to any irregularities in the flyleaf surface or the book insert thickness, and still apply adequate pressure to achieve uniform sealing. Final rolls 40 are constructed similarly as rolls 28. The pressure applied by each pair of rolls 6, 28 and 40 is variable to assure proper frictional engagement.

In order to achieve proper air flow and distribution ot both the hot air for heating the flyleaf and the ambient air for cooling the nip rolls 28, an induction fan is used from which the exhaust can be distributed. Hot air can conveniently be supplied by means of electrical heating elements, thermostatically controlled to provide the desire temperature at the necessary flowing.

One objective of the present invention has been to eliminate the prior art problem of excessively and/or non-uniformly heating the book insert which led to excessive and/or non-uniform drying and dehumidifying of the book and resultant warping. With the new technique heating is very rapid and essentially uniform, and the above-described problems are significantly reduced.

In FIG. 2 the outer baffle 32 has part 33 extending close to roll 28 to restrict the high velocity air flow from tending to open the flyleaf and adjacent pages. While rolls 28 apply pressure, they with the book insert mass remove heat from the adhesive so that it cools and hardens quickly. Drive means not shown cause rollers 6, 28 and 40 to rotate at the same speed for transporting the flyleaf book units through the housing. For further explanation of the book manufacturing processes of which this invention is a part, see U.S. Pat. No. 4,420,282 granted Dec. 3, 1982 and pending patent application, Ser. No. 321,541 now abandoned.

The above described preferred embodiment is but one of numerous structural and method variations possible within the spirit and scope of the invention as defined by the appended claims.

What is claimed is:

1. Apparatus for adhering a flyleaf coated on one side with a hot melt adhesive to the exposed outer sheets of a book block insert where the flyleaf is wrapped about and overlies the spine and outer sheets of said book block insert forming a book unit with the outer surface of the flyleaf exposed, the apparatus operable with a source of heated air, a source of cooler air, and in-feed transport means delivering said book units, comprising: a housing defining therein a heating chamber with an entrance for receiving said book units, a cooling chamber with an exit for discharging said book units, first means for flowing heating air from said source of heated air into said heating chamber to impinge on the exposed outer surface of the flyleaf and thence to exit from said heating chamber, a pair of cooling rollers rotatably mounted in said cooling chamber defining between them a nip for receiving each book unit in pressure contact from said first means, second means for flowing cooler air from said source of cooler air into said cooling chamber to impinge on exposed surfaces of said cooling rollers and to exit said cooling chamber, and third means for transporting said book units through said housing.

2. Apparatus according to claim 1 wherein said rollers are each coated with a heat resistant elastomer such as silicone rubber.

3. Apparatus according to claim 1 wherein said housing further comprises thermally insulated walls bounding at least parts of said heating chamber.

4. Apparatus according to claim 3 further comprising means for thermally insulating said cooling rollers from said heating chamber.

5. Apparatus according to claim 1 wherein said source of heated air has a temperature in the range of 500°–600° F., and said source of cooler air has a temperature in the range of 40 to 100° F.

6. Apparatus according to claim 1 wherein said third means is said pair of cooling rollers which receive said book units from said infeed transport means and discharge said book units from said cooling chamber.

7. Apparatus for adhering a flyleaf coated on one side with a hot melt adhesive to the exposed outer sheets of a book block insert where the flyleaf is wrapped about and overlies the spine and outer sheets of said book block insert forming a book unit with the outer surface of the flyleaf exposed, the apparatus operable with a source of heated air, a source of cooler air, and in-feed transport means delivering said book units, comprising: a housing, means for transporting each of said book units through said housing, first means for flowing heated air from said source of heated air to impinge on the exposed outer surface of flyleaves of book units transported into said housing to melt said adhesive, a pair of cooling rollers rotatably mounted in said housing and defining between them a nip for receiving in pressure contact each book unit heated by said means, and second means for flowing cooler air from said source of cooler air to impinge on exposed surfaces of said cooling rollers, whereby melted adhesive of said heated book units will be hardened when such units are engaged by and between said cooling rollers.

8. A method for adhering a flyleaf coated on one side with a hot melt adhesive to the exposed outer sheets of a book block insert where the flyleaf is wrapped about and overlies the spine and outer sheets of said book block insert forming a book unit with the outer surface of the flyleaf exposed, the method operable with a source of heated air, a source of cooler air, and in-feed transport means delivering said book units, the method comprising: applying a flow of heated air to impinge on said exposed flyleaf surfaces and thereby heating said adhesive to its melting point, subsequently applying pressure to and cooling said exposed outer surfaces of said flyleaf until said adhesive has a temperature below its melting point by passing said heated book unit between and in pressure contact with a pair of cooling rollers.

9. A method according to claim 8 comprising the further steps of providing a first chamber defining a passage therethrough for said book unit to pass through, directing said heated air to enter said first chamber, impinge on said exposed flyleaf and then exit said first chamber, providing a second chamber adjacent the first and housing said pair of cooling rollers, directing said cooler air to enter said second chamber, impinge on said cooling rollers, and then exit said second chamber.

10. A method according to claim 8 comprising the steps of transporting said book units in vertical orientation with the spine downward, orienting said pair of cooling rollers with their axes entending vertically, providing first and second pairs of rollers with their axes oriented vertically preceding and following said colling rollers respectively, whereby said book units are transported by drive contact successively between said first, cooling and second pairs of rollers.

11. In a book manufacturing apparatus including a perfect binding station providing book units each comprising a book block insert about which is wrapped a flyleaf having its inside surface coated with heat-sensitive adhesive, and exposed outer surfaces, and a casing-in station, the improvement of a flyleaf sealer situated in-line between said perfect binding station and said casing-in station, comprising a housing, first means for receiving said book units and applying a flow of heated air to the exposed outer surfaces of said flyleaf, thereby heating said adhesive to a temperature above its melting point, second means for applying pressure to and cooling said exposed outer surfaces until said adhesive is cooled to a temperature below its melting point by passing said heated book units between a pair of pressure rollers and cooling said rollers.

* * * * *